United States Patent
Uozumi et al.

[15] 3,683,721
[45] Aug. 15, 1972

[54] HYDRAULIC CONTROL SYSTEM FOR AUTOMATIC TRANSMISSIONS

[72] Inventors: Sumio Uozumi; Keiji Kogaki, both of Toyota, Japan

[73] Assignee: Toyota Jidosha Kogyo Kabushiki Kaisha, Toyota-shi, Japan

[22] Filed: Aug. 24, 1970

[21] Appl. No.: 66,274

[30] Foreign Application Priority Data

Sept. 9, 1969 Japan ..................... 44/71015
Dec. 30, 1969 Japan ..................... 44/105482

[52] U.S. Cl. .................................... 74/869, 74/868
[51] Int. Cl. ............................................. B60k 21/02
[58] Field of Search ............................... 74/868, 869

[56] References Cited

UNITED STATES PATENTS

| | | | |
|---|---|---|---|
| 3,561,296 | 2/1971 | Iijima | 74/869 |
| 2,770,148 | 11/1956 | Wayman | 74/869 |
| 3,146,630 | 9/1964 | Ivey | 74/869 |
| 3,158,037 | 11/1964 | Searles | 74/869 X |
| 3,212,357 | 10/1965 | Knowles et al. | 74/869 X |
| 3,369,430 | 2/1968 | Haley | 74/869 X |
| 3,400,612 | 9/1968 | Pierce, Jr. | 74/869 X |
| 3,400,613 | 9/1968 | Johnson et al. | 74/869 |

*Primary Examiner*—Carlton R. Croyle
*Assistant Examiner*—Thomas C. Perry
*Attorney*—McGlew and Tuttle

[57] ABSTRACT

A hydraulic control system for automatic transmissions includes a torque converter, a gear train consisting of planetary gears and a hydraulic servo system for engaging the gear train at a certain drive gear ratio. The hydraulic servo system comprises a shift valve group, a throttle valve, a governor valve, a manual selector valve, a pressure regulator valve, an auxiliary regulator valve and a throttle relay valve arranged in an interconnected network. When the manual selector valve is placed in the "D" range, the governor pressure and the throttle pressure act on the auxiliary regulator valve to change the supply of pressurized hydraulic fluid to the pressure regulator valve. The hydraulic control pressure is decreased as the governor pressure increases, and at the same time, the control pressure is increased with the increase in the throttle pressure. When the throttle pressure drops below a certain value in the application of the engine brake and when shifting the manual selector valve from the "D" range to the "2" or "L" range, the throttle relay valve is actuated by the throttle pressure and actuation of the auxiliary regulator valve is blocked. Consequently, the supply of hydraulic control fluid to the pressure regulator valve is interrupted so that the hydraulic control fluid is maintained at a constant high value in relationship to the governor pressure.

4 Claims, 5 Drawing Figures

PATENTED AUG 15 1972

INVENTORS:
SUMIO UOZUMI
KEIJI KOGAKI

BY McGlew and Toren
ATTORNEYS

HYDRAULIC CONTROL SYSTEM FOR AUTOMATIC TRANSMISSIONS

BACKGROUND OF THE INVENTION

The present invention is directed to a hydraulic control system for automatic transmissions used in automobiles and the like and, more particularly, it is directed to maintaining a constant high pressure of the hydraulic control fluid when the throttle valve opening is reduced below a certain value and regardless of the vehicle speed.

This type of hydraulic control system utilizes a regulator valve for maintaining the output pressure from a hydraulic pump, which varies with driving speed, at a constant value, or to elevate the pressure as conditions within the system vary from time to time. The hydraulic fluid whose pressure is regulated by the valve, that is, the control pressure hydraulic fluid is converted by a throttle valve or a governor valve to provide a signal pressure hydraulic fluid corresponding to the throttle valve opening or the axle speed of the vehicle. Further, the hydraulic fluid is directed to a hydraulic servo system of the transmission through a shift valve group which is operated by the hydraulic fluid from the throttle valve and the governor valve. In the case of an automatic transmission having three forward speeds and one reverse speed, the hydraulic servo system includes a front clutch, a rear clutch, a front brake band and a rear brake band. The rear brake band may be replaced with a disc brake. The hydraulic fluid required for the actuation of the clutch or brake should have a pressure conforming to the torque to be transmitted or held by the clutch or brake. Further, it is also necessary to apply the brake or clutch quickly or slowly depending on the vehicle speed at the time a gear change is to be effected. Generally speaking, the hydraulic fluid used for control purposes is given a higher pressure in the low and medium speed ranges (positions) and has pressure characteristics which increase with the increase of the throttle valve opening conforming to the engine load. In the high speed range (position), the pressure is lower than in the low and medium speed ranges. When the vehicle is being driven by the engine, the automatic transmission is operated satisfactorily by the hydraulic fluid having the above-mentioned characteristics. However, when the vehicle is traveling downhill and is to be braked by means of the engine brake, the operating force of the brake band attached to the transmission is not sufficiently large to apply the desired braking effect. For instance, when the shift lever is shifted from the high to the medium range to apply the engine brake when traveling at high speed, the front brake band is operated. The brake band runs along a drum to be braked and at one end is secured to a fixed frame by means of an anchor bolt. The other end of the brake band is attached to an application lever operated by a hydraulic piston. When the shift lever is to be changed from the low range to the medium range, the end of the brake band at the anchor bolt side is positioned in relationship to the rotational direction of the drum to be braked. Therefore, the other end of the brake band containing the application lever is pulled by an appropriate force in the direction conforming to the rotational direction of the drum. In this manner, a sufficiently large braking force is developed by a relatively small piston operating force. However, when the shift lever is shifted from the high range to the medium range, the drum to be braked will be rotated in the reverse direction to that mentioned above, because the axle speed is higher than that obtainable in the medium speed range. Accordingly, the application lever end of the brake band has to develop a large pulling force due to the self-excitation of the brake and the piston operating force will be several times as large as that described above in order to develop the same braking force.

SUMMARY OF THE INVENTION

The primary object of the present invention is to provide a hydraulic control system for an automatic transmission which maintains the hydraulic fluid at a constant high pressure, regardless of the vehicle speed, when the throttle valve opening is reduced below a certain value.

Another object of the invention is to afford a hydraulic control system for an automatic transmission which insures the application of the 2nd gear brake band to the drum to be braked by placing the shift lever into the position of the two speed (medium and low speed) shifting range or low range and reducing the throttle valve opening while traveling at high speed, so that the engine brake is securely applied in spite of the existence of directivity in the braking characteristic of the brake band.

Still another object of the invention is to provide a hydraulic control system for an automatic transmission which can be easily manufactured through the selection of an advantageous construction and combination of valves.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there are illustrated preferred embodiments of the invention.

DETAILED DESCRIPTION OF THE INVENTION

Figure 1:
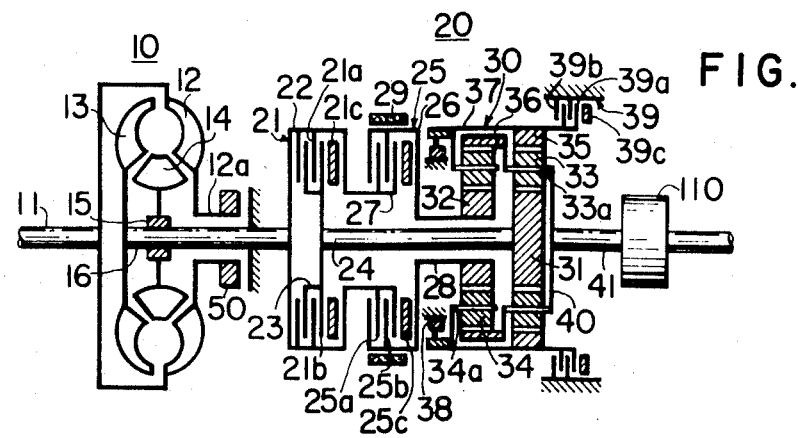
FIG. 1 is a schematic representation of a planetary gear transmission with a torque converter in which the hydraulic control system of the present invention is utilized.

FIG. 1 shows an example of an automatic transmission for an automobile in which the hydraulic control system of the present invention is incorporated. This automatic transmission has three forward and one reverse speeds. As is described subsequently herein, automatic multi-speed shifting ranges for high, medium and low speeds, automatic two-speed shifting range for medium and low speeds, low speed range, the reverse range, the parking and neutral ranges can be obtained depending on the position in which the manual selector valve is placed. As illustrated in FIG. 1, the automatic transmission consists of a torque converter 10 and a planetary gear transmission 20. The torque converter 10 comprises an input shaft 11 and a pump impeller 12, a turbine runner 13, a stator 14, a one-way clutch 15 and an output shaft 16. The input shaft is driven by the crank shaft of an engine, not shown, and the rotating force of the pump impeller 12 is transmitted by means of the hydraulic fluid to the turbine runner 13. A hydraulic pump for the hydraulic control system is connected to the extended portion 12a of the pump impeller 12.

The planetary gear transmission 20 consists of a planetary gear mechanism 30 and a front clutch 21, a rear clutch 25, a front brake band 29, and a rear disc brake 39 for shifting the gear mechanism at a predetermined reduction ratio. The clutches 21 and 25 consist, respectively, of drums 22, 26, hubs 23, 27, driving clutch disc groups 21a, 25a, and driven clutch disc groups 21b, 25b, which are supported by the drums and hubs, and hydraulic pistons 21c, 25c for connecting the clutch disc groups. The drum 22 of the front clutch 21 and the hub 27 of the rear clutch 25 are integrally connected to the output shaft 16 of the torque converter 10.

An intermediate shaft 24 is connected to the hub 23 of the front clutch 21, and a hollow intermediate shaft 28 is connected to the drum 26 of the rear clutch 25. These intermediate shafts are each provided with a sun gear 31, 32, respectively, at one end. A plurality of planetary pinion groups 33, 34, are arranged about the sun gears 31, 32, respectively, and the planetary gear groups mesh with embracing ring gears 35, 36, respectively. Drum 37 supports the ring gear 35 and a one-way clutch 38 and a rear disc brake 39 are positioned between the drum and a fixed frame.

The rear disc brake 39 is made up of a disc group 39a, a plate group 39b, and a hydraulic piston 39C. Shafts 34a for the planetary pinions 34 are supported by the drum 37. The shafts 33a for the planetary pinions 33 are integrally connected to the ring gear 36 and are secured through a planetary carrier 40 to an output shaft 41. Disposed axially along the output shaft 41 from the planetary carrier 40 is a governor 110 which will be described subsequently herein.

In the automatic transmission described above, the output shaft 16 of the torque convertor 10 and the intermediate shaft 24 are connected, in dependence on the operating condition of the front clutch 21, to obtain the low speed gear. The medium speed gear is obtained by actuating the front clutch 21 and the front brake band 29. The high speed gear is attained by actuating the front clutch 21 and the rear clutch 25. For the reverse gear, the rear clutch 25 and the rear disc brake 39 are actuated. In the low speed gear, the one-way clutch 38 brakes the rotation of the drum 37 in the predetermined direction, however, but it permits the rotation of the drum in the reverse direction. This feature of the one-way clutch 38 is useful in shifting smoothly between the medium and low speed gears. On the other hand, the rear disc brake 39 brakes the drum 37 in either direction thus insuring the ability to shift to the low speed gear.

Figure 2:
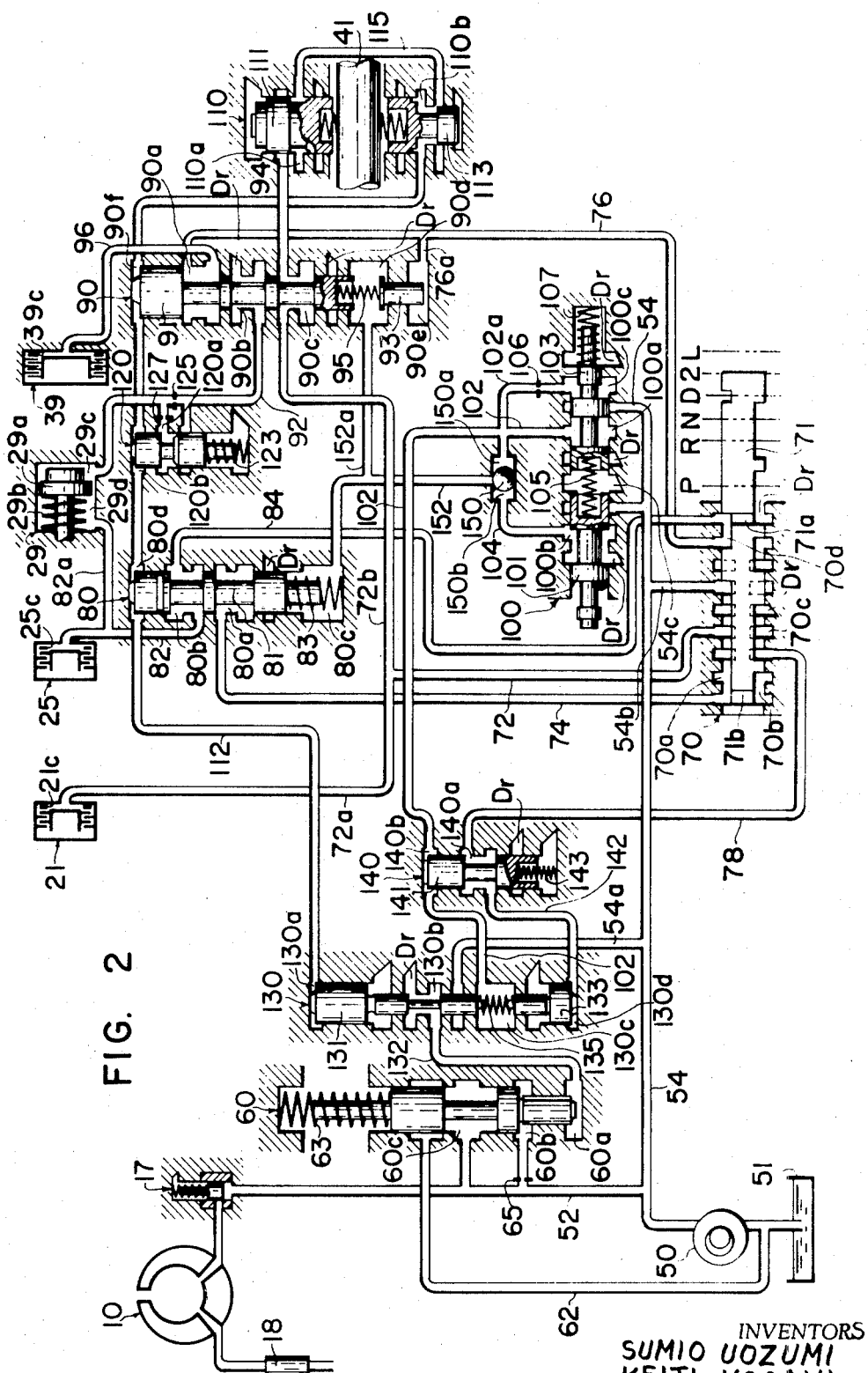
FIG. 2 is a schematic piping diagram of one embodiment of a hydraulic control system incorporating the present invention.

FIG. 2 shows the hydraulic control system for supplying hydraulic fluid to the automatic transmission illustrated in FIG. 1. Shown in the upper portion of FIG. 2 are the torque converter 10, hydraulic pistons 21c, 25c of the clutches 21, 25, hydraulic pistons 29a, 39c of the brakes 29, 39, and the return springs 29b for the brake 29.

At the lower left hand corner of FIG. 2, a hydraulic fluid pump 50 is connected to a hydraulic fluid reservoir 51 for supplying pressurized hydraulic fluid to the hydraulic control system through a passage 54. Branching from the passage 54, is a passage 52 which extends upwardly to the torque converter 10 and a check valve 17 is provided in the passage for preventing any reverse flow of the hydraulic fluid. An oil cooler 18 is connected to the torque converter 10.

The hydraulic fluid passage 52 is connected to a pressure regulator valve 60 which consists of a axially extending valve member 61, a pressure regulating spring 63, biasing the valve member on one end, hydraulic fluid chambers 60a, 60b and 60c, and an orifice 65 located in the branch inlet from passage 52 into the chamber 60b. The pressure regulator valve 60 is arranged to balance the hydraulic force acting on the valve member 61 with the force of the pressure regulating spring 63. When the force directed upwardly on the valve member 61 is large, it will be displaced against the spring 63 uncovering the entrance to the discharge passage 62 permitting the hydraulic fluid to flow through the passage 62 and decrease the discharge pressure from the pump 50 so that the hydraulic pressure in the passages 52 and 54 is maintained at a selected value. Accordingly, the regulation of the pressure of the hydraulic fluid is obtained in the valve 60. In the lower portion of FIG. 2, a manual selector valve 70 is illustrated which is operated by a shift lever, not shown. Located within the valve is an axially extending valve member 71 and the interior of the valve is divided into chambers 70a, 70b, 70c, 70d, and hydraulic fluid discharge openings or ports Dr. The valve member has a pair of cross passages 71a and 71b which interconnect the upper and lower chambers. As illustrated in FIG. 2, the valve member 71 is positioned in the automatic three-speed shifting range (D range), where driving at high, medium or low speeds is automatically accomplished in relationship to the vehicle speed and the throttle valve opening. The position "2" designates the second automatic shift range including the medium and low speeds (Second range). The position "L" indicates the low speed range of the selector valve, and the position designated "N" is the neutral range. The other two positions characterized as "R" and "P" indicate the reverse range and the parking range, respectively. In the "D" range, the chamber 70a of the manual selector valve 70 connects the branch passage 54b of the passage 54 with a pair of hydraulic fluid passages 72 and 74. Connected to a discharge port Dr through the opening 71a and the chamber 70d, is a passage 76 which leads to a shift valve 90 and another passage 84 which leads to another shift valve 80. Connected to the chamber 70c which opens into a discharge port, Dr, is a passage 78 which extends to a throttle relay valve 140.

The passage 72 is directly connected to the hydraulic piston 21c of the front clutch 21 through a branch passage 72a and, accordingly, the front clutch is always operative in the "D" range. Further, another branch passage 72b conveys the hydraulic fluid from the manual selector valve to the shift valve 90 from which it flows is supplied both to the chamber containing the hydraulic piston 29a in the front brake band 29 and to a governor valve 110. Similarly, the hydraulic fluid flows from the manual selector valve 70 through the passage 74 into the shift valve 80 from which it is supplied into the chamber in the rear clutch 25 containing the hydraulic piston 25c.

The shift valve 80 contains an axially extending valve member 81, a bias spring 83 acting against one end of the valve member, and spaced chambers 80a, 80b, 80c, and 80d. The hydraulic fluid which flows through the passage 74 from the manual selector valve 70 enters into the chamber 80a. At the lower end of the valve 80, as viewed in FIG. 2, the chamber 80c receives hydraulic fluid through a passage 152, and which conforms to the pressure of the throttle valve opening. In addition, hydraulic fluid having a pressure conforming to the vehicle speed enters the chamber 80d at the upper end of the valve from a passage 112 which extends between the governor valve 110 and an auxiliary regulator valve 130. When the downwardly acting force developed by the governor pressure acting on the valve member 81 in the chamber 80d becomes larger than the force developed by the throttle pressure plus the tension exerted by the spring 83, the valve member moves downwardly and the control hydraulic fluid within the chamber 80a is directed through a passage 82 to the hydraulic piston 25c of the rear clutch 25 for actuating the clutch. When the valve member 81 is in lower position the passage 82a branching from the passage 82 supplies hydraulic fluid into the chamber 29d for releasing the piston 29a.

The shift valve 90 contains two valve members, 91, 93, and a bias spring 95 extending between the two valve members. Spaced along the valve members within the valve 90, are chambers 90a, 90b, 90c, 90d, 90e, and 90f. The control hydraulic fluid from the manual selector valve 70 passes through the passage 76 and its branch passage 76a into the chamber 90 a located in the range of the valve body 91 and the chamber 90e disposed about the valve member 93. Additionally, control hydraulic fluid from the manual selector valve flows through the passages 72 and 72b into the chamber 90c located about the valve member 91. The throttle pressure is supplied into the chamber 90d of the shift valve 90 through a branch passage 152a from the passage 152. Further, the hydraulic fluid conveying the governor pressure is supplied into the chamber 90f through the passage 112. In the "D," "2," and "L" ranges, the hydraulic fluid from the manual selector valve flows through the passages 72, 72a and 72b, while in the "L" and "R" ranges, the hydraulic fluid flows from the manual selector valve into the passage 76. Therefore, in the "D" and "2" ranges, the valve member 91 moves downwardly when the forces developed by the governor pressure in the chamber 90f exceed the upwardly acting forces developed by the throttle pressure in the chamber 90d plus the biasing action of the spring 95, and the hydraulic fluid within the chamber 90c will pass through the passage 92 into the chamber 29c of the front brake band 29. Accordingly, the front brake band 29 is actuated by this flow of hydraulic fluid, provided that the hydraulic fluid is not being directed into the chamber 29d. On the other hand, in the "L" and "R" ranges, the hydraulic fluid flows through the passage 76 into branch passage 76a and then into chamber 90e and an upwardly directed force is applied to the valve body 93 which pushes the valve member 91 through the medium of the spring 95 to the position shown in FIG. 2. Therefore, the passage 76 is connected to another passage 96 through the chamber 90a for operating the rear disc brake 39.

A throttle valve 100 for establishing the pressure corresponding to the throttle opening, is provided with a pair of axially aligned valve members 101, 103 with a spring 105 extending between the ends of the two valve members and a bias spring 107 acting against the other end of the valve member 103. Spaced along the throttle valve 100 are chambers 100a, 100b, and 100c. Hydraulic fluid flows through the passage 54 from the pump 50 into the chamber 100a. The pressure in the chamber 100a is proportional to the movement of the valve member 101 which is displaced in the rightward direction by means of a throttle lever, not shown. In other words, the movement of the valve member 101 is converted to a force of the spring 105. This force is equal to the hydraulic pressure caused by the difference of the valve land diameters for displacement in the leftward direction within the chamber 100c plus the force supplied by the spring 107. The hydraulic fluid within the chamber 100c flows from the chamber 100a through the passages 102 and 102a and through an orifice 106 which is positioned within the passage 102. As a result, a hydraulic fluid pressure conforming to the throttle valve opening is established in the chamber 100a. Thus, the throttle pressure is produced and is directed into the passage 102 and then into the passage 152 through a ball check device 150.

The ball check device 150 is provided with a pair of chambers 150a and 150b located on the opposite sides of the ball. The ball check device channels, to the passage 152, the hydraulic fluid in the chambers 150a and/or 150b which has the higher pressure. When the throttle valve opening is normal, the throttle pressure developed in the chamber 100a is directed into the passage 152. When the throttle lever is opened fully, the hydraulic fluid in the branch passage 54c from the passage 54 passes directly through the chamber 100b into the passage 104 and then into the chamber 150b of the ball check device 150. Therefore, since the hydraulic fluid pressure developed by the pump is higher than the throttle pressure, this pressure is directed into the passage 152, and, in this case, a so-called kick-down is effected.

The governor valve 100 contains a pair of centrifugal valve members 111, 113 disposed on the opposite sides of the output shaft 41. A chamber 110a is disposed about the valve member 111 and another chamber 110b is located about the valve member 113. These two chambers 110a and 110b are interconnected by a connection passage 115. The valve is arranged to balance the centrifugal forces of the valve bodies 111 and 113, which are developed by the rotation of the output shaft 41, and the force of the hydraulic fluid within the chambers 110a and 110b. Accordingly, a pressure conforming to the vehicle speed, that is, the governor pressure is developed in the oil chamber 110b. The governor pressure is directed through the passage 112 into the chambers 80d and 90f located at the upper ends of the shift valves 80 and 90, as they appear in FIG. 2.

Disposed between the shift valves 80 and 90 is an orifice control valve 120. The orifice control valve is connected to the passage 92 which is connected to the chamber 29c of the front brake band 29. The orifice control valve contains a valve member 121, a bias spring acting against one end of the valve member, and a pair of spaced chambers 120a and 120b. In the passage 92 and in the branch passage leading into the chamber 120a, orifices 125, 127, respectively, are provided. The orifice 125 is arranged in the passage 92 in series while the orifice 127 is connected in parallel with the orifice 125 as the valve member 121 is moved downwardly when the governor pressure within the chamber 120b is within a certain range of values. Therefore, the orifice control valve 120 accelerates the operation of the brake band 29 within a certain vehicle speed range and insures the speed change for the medium range.

As is apparent from the above description, the selection of the ranges "D," "2," "L," "R" can be accomplished by the operation of the manual selector valve 70. Furthermore, the shift valves 80 and 90 and the orifice control valve 120 are operated in relationship to the throttle pressure and the governor pressure. For example, in the "D" range, the selection of high, medium and low speeds can be automatically accomplished.

In accordance with this invention, the embodiment illustrated in FIG. 2 is provided with an auxiliary regulator valve 130 and a throttle relay valve 140. The auxiliary regulator valve 130 contains two axially aligned valve members 131, 133 separated by a spring 135 and chambers 130a, 130b, 130c, and 130d are located along the valve members. A flow of hydraulic fluid at the control pressure developed in the pump passes through the passage 54 and branch passage 54a into the chamber 130b. A passage 132 opens at one end into the chamber 130b and is connected at its other end to the chamber 60a located at the lower end of the pressure regulator valve 60. The hydraulic fluid supplied from the manual selector valve flows through a passage 142 from the throttle relay valve 140 into the chamber 130d.

The throttle relay valve 140 contains a valve member 141, a spring 143, biasing the valve member upwardly, and a pair of spaced chambers 140a and 140b. The signal pressure provided by the throttle pressure is supplied through the passage 102 from the throttle valve 100 into the chamber 140b. The control pressure provided by the hydraulic fluid from the manual selector valve flows through the passage 78 into the chamber 140a. In this valve, the force produced by the throttle pressure in the chamber 140b is equal to the force of the upwardly acting spring 143. When the force developed by the throttle pressure becomes larger than the force exerted by the spring, the flow of hydraulic fluid from the passage 78 into the chamber 140a is cut off by the valve member 141 with the result that the passage of the hydraulic fluid through the chamber 140a into the passage 142 and then into the chamber 130d of the auxiliary regulator valve is shut off. Under this condition, the auxiliary regulator valve serves as a switching valve consisting of the valve member 131 and the spring 135. When the force of the governor pressure in the chamber 130a acting on the upper surface of the valve member 131 becomes greater than the force exerted by the spring 135 plus the throttle pressure acting on the valve member in chamber 130c, the hydraulic fluid flowing through the branch passage 54a flows through the chamber 130b into the passage 132 and then into the chamber 60a of the pressure regulator valve. In this case, the hydraulic fluid exerts an upward force of the valve member in the chambers 60a and 60b and the valve member is arranged to balance such upward forces with the force exerted by the spring 63. Consequently, the upward pressure of the hydraulic fluid is decreased by an amount corresponding to the area of the valve member in the chamber 60a. In other words, when the throttle pressure exceeds a certain value, the throttle relay valve 140 interrupts the supply of hydraulic fluid through the passage 142 to the auxiliary regulator valve 130. When this occurs, the supply of hydraulic fluid at the control pressure from the branch passage 54a into the chamber 60a of the pressure regulator valve 60 is carried out in accordance with the relative ratio of the governor pressure and the throttle pressure. This operation is the same as that of conventional valves. Therefore, in the arrangement of the auxiliary regulator valve 130 shown in FIG. 2, it is possible to supply the throttle pressure into the valve but not the pressure of the hydraulic fluid conveyed through the passage 54a.

On the other hand, when the throttle pressure drops below a certain value, the pressurized hydraulic fluid flowing through the passage 78 and the chamber 140a of the throttle relay valve 140 continues through the passage 142 and into the chamber 130d of the auxiliary regulator valve 130. The upwardly directed force developed by the hydraulic fluid received from the manual selector valve is always greater than the force of the governor pressure which is applied to the opposite end of the valve member in the chamber 130a, with the result that the valve member 133 pushes the valve body 131 upwardly and shuts off the passage 54a into the chamber 130b. Accordingly, the chamber 130b is opened into the discharge opening Dr. Consequently, no flow of hydraulic fluid passes into the chamber 60a of the pressure regulator valve, and only the force of the hydraulic fluid into the chamber 60b is balanced against the force of the spring 63 and the control pressure of the hydraulic fluid is maintained at a constant large value. That is, when the throttle pressure is lower than a certain value, the control pressure of the hydraulic fluid is maintained at a certain high value regardless of the value of the governor pressure.

Figure 4:
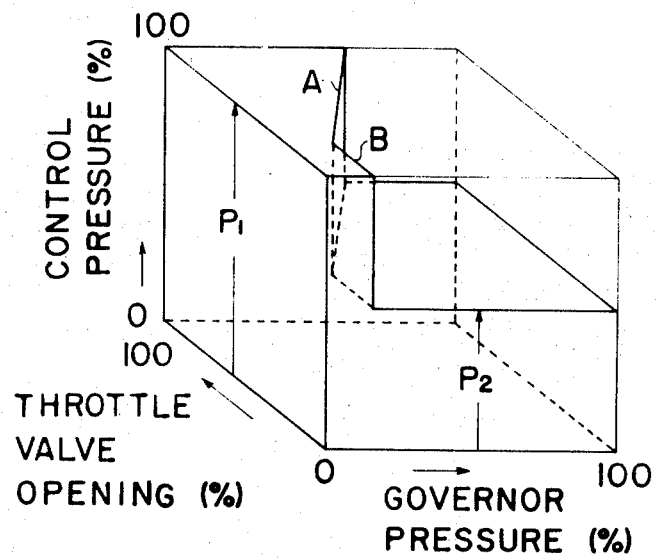
FIG. 4 is a diagram of the hydraulic control pressure characteristics in an automatic three speed shifting range (high speed range)
Figure 5:
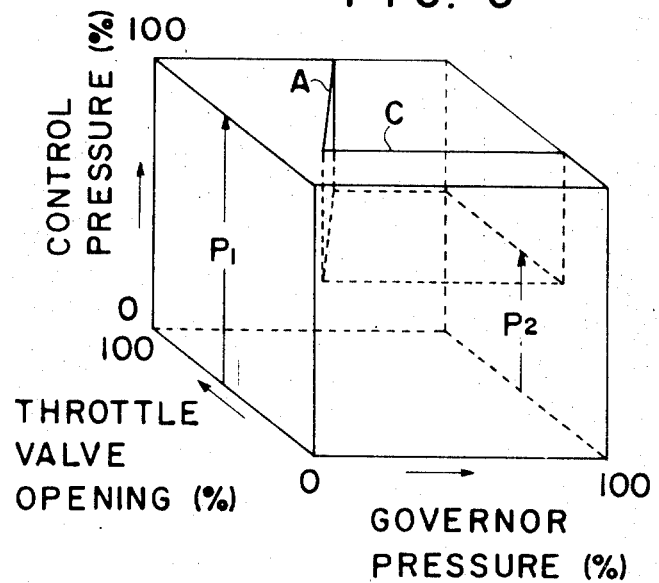
FIG. 5 is a diagram of the hydraulic control pressure characteristics in the automatic two speed shifting range (medium speed range) or the low range.

The characteristics of the hydraulic control system of the present invention are illustrated in the diagrams of FIGS. 4 and 5. FIG. 4 illustrates the pressure characteristics of the hydraulic fluid acting as the control source when the manual selector valve 70 is in the "D" range. In this range, the hydraulic fluid does not flow into the passage 78. Since this passage opens into the discharge port Dr, the hydraulic fluid is not supplied into the chamber 130d of the auxiliary regulator valve in all cases, and the pressure control on the hydraulic fluid is accomplished by means of the valve body 131 alone. In other words, in this case, when the downwardly acting forces generated by the governor pressure in the chamber 130a of the auxiliary regulator valve is lower than the force of the spring 135 plus the upwardly acting force developed by the throttle pressure in the chamber 130c, no hydraulic fluid at the control pressure is fed into the chamber 60a of the pressure regulator valve. As a result, the pressure of the hydraulic fluid acting as the control source is set to a high pressure $P_1$. As the force supplied by the governor pressure increases to a degree greater than the force provided by the spring plus that of the throttle pressure, the hydraulic fluid is supplied into the chamber 60a and the hydraulic fluid acting as a control source is reduced to a pressure $P_2$. This boundary surface is designated by A in FIG. 4. As can be seen in the diagram, the throttle valve opening and the governor pressure are located on linearly proportional lines. The boundary surface B indicates the presence of the non-actuating region of the throttle valve 100. When the throttle valve opening is small, the throttle pressure is maintained constant and has no relation with the throttle valve opening, therefore, the control pressure steps down at the constant governor pressure.

In FIG. 5, the pressure characteristics of the hydraulic fluid control source in the "2" and "L" ranges are indicated where the hydraulic fluid is supplied through the manual selector valve into the passage 78. When the throttle valve opening, that is the throttle pressure corresponding thereto is above a certain value, the hydraulic fluid is not supplied into the chamber 130d of the auxiliary regulator valve 130 due to the action of the throttle relay valve 140. Consequently, the characteristics shown in FIG. 5 become identical with those shown in FIG. 4 and the hydraulic fluid control source having two levels of pressure $P_1$ and $P_2$ is obtained at the boundary surface A. When the throttle valve opening is below a certain value, the hydraulic fluid control source is always fed through the throttle relay valve 140 into the chamber 130d of the auxiliary regulator valve 130, and, as a result, the hydraulic fluid at the control pressure is not supplied into the chamber 60a of the pressure regulator valve 60. Since the hydraulic fluid is discharged from the oil chamber 130b through the discharge opening Dr, the higher pressure $P_1$ is obtained in the range shown by the boundary surface C. When the engine brake is required while the vehicle is traveling at high speed, the hydraulic fluid having a high pressure is obtained by placing the manual selector valve 70 in the "2" or "L" range and throttling the throttle valve, thereby insuring the operation of the front brake band.

Figure 3:
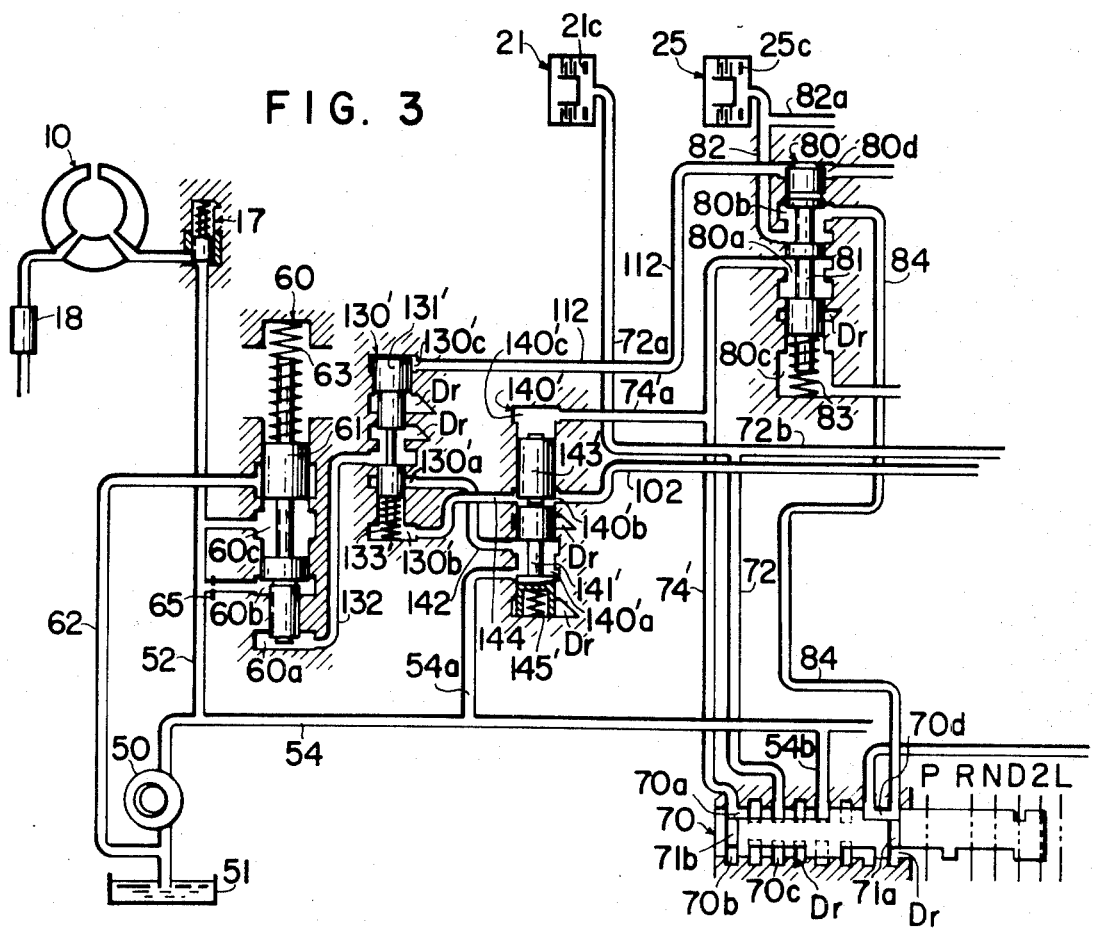
FIG. 3 is a schematic piping diagram of another embodiment of a hydraulic control system incorporating the present invention.

Another embodiment of the present invention is shown in FIG. 3, and parts similar to those illustrated in FIG. 2 are identified with the same reference numerals. To obtain the pressure characteristics mentioned above, in this second embodiment of the invention, an auxiliary regulator valve 130' contains a valve member 131', a biasing spring 133' acting upwardly against the lower end of the valve member 131' and a plurality of chambers 130'a, 130'b and 130'c. The hydraulic fluid at the control pressure is supplied through the passage 54'a and a throttle relay valve 140' into the chamber 130'a. The throttle pressure is directed through passage 144 into the chamber 130'b. The governor pressure is fed through the passage 112 into the chamber 130'c. When the downwardly acting force developed by the governor pressure in the chamber 130'c becomes greater than the throttle pressure acting within the chamber 130'b plus the upwardly acting force of the spring 133', the valve member 131' is displaced downwardly and the hydraulic fluid in the chamber 130'a is directed into the passage 132. Such points of actuation are shown by the boundary surface A in the diagrams of FIGS. 4 and 5.

As distinguished from the throttle relay valve 140 shown in FIG. 2, in FIG. 3, the throttle relay valve 140' contains a pair of axially aligned valve member 141' and 143' with a spring 145' acting upwardly against the valve members 141', and chambers 140'a, 140'b and 140'c are located within the valve 140'. The hydraulic fluid at the pressure within the passage 54 is conducted through the branch passage 54'a into the chamber 140'a. The throttle pressure is supplied through the passage 102 into the chamber 140'b. The hydraulic fluid from the manual selector valve is supplied through passage 74' and 74'a into the chamber 140'c. The two valve members 141' and 143' are formed of land groups having the same diameter and they are arranged to contact each other at their ends located within the chamber 140'b. As described above, since the hydraulic fluid is supplied into the passage 74' only when the manual selector valve 70 is in the "D" range, the hydraulic fluid only flows through the passage 74'a into chamber 140'c at that time. The force of the hydraulic fluid acting on the valve member 143' in the chamber 140'c is arranged to be larger than the force of the spring 145'. The valve member 143' pushes the valve body 141' downwardly and connects the passages 54'a and 142 through the chamber 140'a, as shown in FIG. 3. Accordingly, the hydraulic fluid in the passage 54'a is connected into the chamber 130'a of the auxiliary regulator valve 130', with the result that the pressure characteristics illustrated in FIG. 4 are obtained within the "D" range.

When the valve member 71 of the manual selector valve 70 is shifted in the rightward direction and is placed in the "2" or "L" range, the supply of hydraulic fluid into the passage 74' is blocked. Therefore, the pressure of the hydraulic fluid drops to zero in the chamber 140'c of the throttle relay valve 140. Consequently, the valve member 143' is displaced upwardly by the throttle pressure in the chamber 140'b and is separated from the lower valve member 141'. In this arrangement, the downwardly acting forces of the throttle pressure in the chamber 140'b opposed to the tension of the spring 145'. When the throttle pressure drops below a certain value, the valve member 141' is displaced upwardly by the spring action and the connection of the passage 54'a with the passage 142 is cut off. Thus, the flow of hydraulic fluid into the chamber 130'a of the auxiliary regulator valve 130 is interrupted. Irrespective of the shifting conditions acting on the valve member 131', the pressurized fluid is not supplied into the passage 132. It other words, in the "2"

and "L" ranges, the characteristics shown by the boundary surface A in FIG. 5 are obtained when the throttle valve opening is above a certain value. When the throttle valve opening drops below the certain value, the characteristics are shown by the boundary surface C.

When the hydraulic fluid at the control pressure is supplied through the passage 132 into the oil chamber 60a of the pressure regulator valve 60, the pressure acts on a larger valve area of the valve member 61 and the hydraulic fluid in the chamber 60c flows into the discharge passage 62, thus regulating the hydraulic fluid at the lower pressure $P_2$. When the supply of pressurized hydraulic fluid into the chamber 60a is discontinued, only the action of the hydraulic fluid in the chamber 60b acts on the valve member as an upwardly directing force, and the hydraulic fluid flows into the discharge passage 62. Consequently, the pressure of the hydraulic fluid is maintained at the pressure $P_1$.

The first embodiment of the hydraulic control system for automatic transmissions is constructed so that the valve member 133, having different land diameters, is provided separately at the lower end of the spring 135 from the other valve member 131 in order to direct the control source of hydraulic fluid selected by the throttle relay valve 140 to the lower surface of the valve member 133. In the second embodiment shown in FIG. 3, the separate valve members of the auxiliary regulator valve 130' is eliminated. Instead, a pair of valve members 141' 143' are provided in the throttle relay valve 140' for directing the pressurized hydraulic fluid required for identifying the ranges "D," "2" or "L," to one end of the valve member 143'. Consequently, the construction of the system is more simplified and, as a result, it is easier to manufacture this type of valve. The hydraulic fluid acting as a control source is directed into the oil chamber 140'c of the throttle relay valve 140' through the passage 74'a, therefore, it is not necessary to direct the hydraulic fluid from the manual selector valve 70 through a special passage. As a result, it is possible to shorten the length of the manual selector valve 70.

What is claimed is:

1. A hydraulic control system, for automatic transmissions in automotive vehicles, comprising, in combination, means, including a pump, constituting a source of pressurized fluid; a multi-chambered manual selector valve, operable to select the operating speed range of an automatic transmission, connected to said source to receive pressurized fluid therefrom; a multi-chambered throttle valve connected to said source to receive pressurized fluid therefrom and operable to develop a hydraulic pressure corresponding to a throttle opening; a multi-chambered governor valve connected in a pressurized fluid communication with said manual selector valve and operable to develop a hydraulic pressure corresponding to vehicle speed; a multi-chambered pressure regulator valve connected to said source to receive pressurized fluid therefrom and to return pressurized fluid thereto to maintain the hydraulic pressure from said source at a selected value; a multi-chambered throttle relay valve having one chamber in pressurized fluid communication with said manual selector valve and another chamber in pressurized fluid communication with said throttle valve; a multi-chambered auxiliary regulator valve having one chamber in pressurized fluid communication, through one chamber of said throttle relay valve, with said throttle valve, another chamber in pressurized fluid communication, through another chamber of said throttle relay valve, with said manual selector valve, and a further chamber in pressurized fluid communication with said governor valve; said auxiliary regulator valve being in pressurized fluid communication with said source and with a chamber of said pressure regulator valve to control communication between said last-named chamber and said source; said auxiliary regulator valve being subjected to the pressure controlled by said throttle valve and to the pressure controlled by said governor valve, acting in opposition to each other; said throttle relay valve being subjected to the pressure controlled by said throttle valve; and spring means acting on said throttle relay valve in opposition to the pressure controlled by said throttle valve; said auxiliary regulator valve, through its connection to said source and to said last-named chamber of said pressure regulator valve, controlling said pressure regulator valve to change the selected value of the pressure of the pressurized fluid in accordance with the pressures controlled by said throttle valve and by said governor valve; said throttle relay valve increasing the selected value of the pressurized fluid from said source when the pressure controlled by said throttle valve decreases below a certain value.

2. A hydraulic control system, as set forth in claim 1, wherein said throttle relay valve has a displaceable valve member subjected to pressurized fluid from said throttle valve, said auxiliary regulator valve comprises a first valve member and a second valve member coaxial with said first valve member, a spring disposed between said first and second valve members for biasing said valve members apart, said first valve member being subjected, on spaced surfaces, to the throttle pressure and to the governor pressure for displacement within said auxiliary regulator valve for alternately admitting and blocking flow of the pressurized fluid flowing from said source through said auxiliary regulator valve into said pressure regulator valve, said second valve member being subjected to pressurized fluid in communication therewith through said throttle relay valve from said throttle valve and through said throttle relay valve from said manual selector valve and, when the throttle pressure acting on said second valve member through said throttle relay valve falls below a selected value, said second valve member being displaced towards said first valve member and, through said spring, displacing said first valve member for discontinuing the flow of the pressurized fluid from said auxiliary regulator valve to said pressure regulator valve.

3. A hydraulic control system, as set forth in claim 1, wherein said auxiliary regulator valve comprises a spring biased displaceable valve member subjected on spaced surfaces, to pressurized fluid at the throttle pressure and at the governor pressure for alternately admitting and blocking flow of the pressurized fluid therefrom to said pressure regulator valve, said throttle relay valve comprising a spring biased first valve member and a second valve member in axial alignment therewith, said first valve member being subjected to pressurized fluid at the throttle pressure so that said first valve member cuts off flow of pressurized fluid from said source to said auxiliary regulator valve when the throttle pressure drops below a selected value, said second valve member having one surface thereof subjected to the pressurized fluid from said manual selector valve for displacing said second valve member into contact with said first valve member for displacing said first valve member for effecting a flow of pressurized fluid from said source into said auxiliary regulator valve, and said second valve member having another surface thereof subjected to the pressurized fluid at the throttle pressure from said throttle valve so that, when flow of the pressurized fluid from said manual selector valve is discontinued, said second valve member is displaced away from said first valve member and said first valve member, in dependence on the throttle pressure acting thereon, can be displaced for cutting off flow to said auxiliary regulator valve.

4. A hydraulic control system, as set forth in claim 1, wherein the hydraulic control system is in pressurized fluid communication with a front clutch, a rear clutch, a front brake, and a rear brake, the hydraulic control system including a multi-chambered first shift valve, a multi-chambered second shift valve, and a multi-chambered orifice control valve, one chamber in each of said first valve, second shift valve, and orifice control valve being in pressurized fluid communication with said governor valve, said first shift valve having separate chambers in communication with said manual selector valve and a further chamber in communication with said throttle valve, and one of said chambers in said first shift valve in pressurized fluid communication with said manual selector valve being in pressurized fluid communication with said rear clutch and said front brake, said second shift valve having two separate chambers therein in pressurized fluid communication with said manual selector valve, another chamber in said second shift valve being in pressurized fluid communication with said throttle valve and still another chamber in said second shift valve in pressurized fluid communication with said governor valve and with said front clutch, one of the chambers in said second shift valve in communication with said manual selector valve being arranged to supply pressurized fluid to said rear brake and yet another chamber arranged to supply pressurized fluid to said front brake, said orifice control valve having a chamber therein arranged to receive pressurized fluid passing from the chamber in said second shift valve to said front brake, and orifice means disposed in the path of flow of the pressurized fluid from the chamber in said shift valve to said front brake and to the chamber in said orifice control valve.

* * * * *